(12) United States Patent
Pino, Jr. et al.

(10) Patent No.: US 8,321,885 B2
(45) Date of Patent: Nov. 27, 2012

(54) IN-HOME SYSTEM MONITORING METHOD AND SYSTEM

(76) Inventors: Angelo J. Pino, Jr., New York, NY (US); Mohammed Sattar, Bell Harbor, NY (US)

( * ) Notice: Subject to any disclaimer, the term of this patent is extended or adjusted under 35 U.S.C. 154(b) by 468 days.

(21) Appl. No.: 12/511,048

(22) Filed: Jul. 28, 2009

(65) Prior Publication Data
US 2011/0030016 A1     Feb. 3, 2011

Related U.S. Application Data

(60) Provisional application No. 61/084,476, filed on Jul. 29, 2008.

(51) Int. Cl.
| | |
|---|---|
| H04H 9/00 | (2006.01) |
| H04H 7/16 | (2006.01) |
| H04N 7/18 | (2006.01) |
| H04N 7/14 | (2006.01) |
| H04N 11/00 | (2006.01) |

(52) U.S. Cl. ............... 725/12; 725/10; 725/9; 725/80; 348/14.04; 348/152; 348/153; 348/154; 348/155; 348/552

(58) Field of Classification Search ............ 725/12, 725/10, 9, 80; 348/14.04, 152–155, 552
See application file for complete search history.

(56) References Cited

U.S. PATENT DOCUMENTS
| | | | | |
|---|---|---|---|---|
| 7,683,924 | B2* | 3/2010 | Oh et al. ............... | 348/14.01 |
| 2004/0215694 | A1* | 10/2004 | Podolsky ............... | 709/201 |
| 2006/0063517 | A1* | 3/2006 | Oh et al. ............... | 455/415 |
| 2007/0288975 | A1* | 12/2007 | Cashman et al. ....... | 725/110 |
| 2011/0131606 | A1* | 6/2011 | Durden et al. .......... | 725/40 |

FOREIGN PATENT DOCUMENTS
KR    10-2001-0108894    * 12/2001

* cited by examiner

*Primary Examiner* — Hoang-Vu A Nguyen-Ba
(74) *Attorney, Agent, or Firm* — Jeffrey S. Melcher; Manelli Selter PLLC (57) ABSTRACT

A system, method and device for providing communications with an in-home system at a residence of a user are provided. In one embodiment, the method comprises receiving digital television programming content from a television service provider, receiving a first user input of a selected digital television programming content, in response to receiving the first user input, causing the selected digital television programming content to be displayed on a television, receiving a message from an in-home system, in response to receiving the message, causing a notification to be displayed on the television as an overlay over the displayed television programming content, receiving a first user command, determining a first control message to transmit to the in-home system in response to receiving the first user command, transmitting the first control message to the in-home system, wherein the in-home system may comprise a video camera, an entry way security system, an HVAC system, a lighting system, an alarm system, or other in-home system. User inputs may be received via a remote control to a set top box or from a computing device at a remote computer system through the internet and/or a mobile telephone network.

18 Claims, 4 Drawing Sheets

IN-HOME SYSTEM MONITORING METHOD AND SYSTEM

CROSS REFERENCE TO RELATED APPLICATIONS

This application claims priority to U.S. Provisional Patent Application Ser. No. 61/084,476, filed Jul. 29, 2008, which is incorporated herein by reference in its entirety for all purposes.

FIELD OF THE INVENTION

The present invention generally relates to data communications and more particularly, to a system and method for monitoring and controlling various in-home systems such as HVAC, alarm systems, video cameras, and others.

BACKGROUND OF THE INVENTION

With the advent of Digital Television (DTV) comes the ability to create interactive TV (ITV) programming. The "old" analogue set-top box cable units are being phased out and replaced by more robust digital units. Digital cable headends and their supporting infrastructure have made it possible to create and deploy TV applications. These applications allow the viewer to call up movies on demand, play games, record TV programs, etc.

Many consumers would desire to monitor and control various in-home systems and without using an in-home personal computer. As an example, it would be desirable to monitor and control many in-home systems via the consumers television or other display device since most people are familiar with operation of their television and set top box. Additionally, many people spend most of their leisure time watching television, thereby making the television an ideal candidate for monitoring and controlling in-home systems. While a personal computer could be used to monitor and control such systems, consumers may need to purchase (or license the appropriate software, install the software, and learn to operate the software. Additionally, personal computers are often relegated to a home office and/or are often not turned on while consumers watch television. Consequently, for many consumers, monitoring and controlling in-home systems via their television would be preferred.

The present invention provides a cable system and set top box that facilitates monitoring and control of one or more in-home systems via a television or other display device.

SUMMARY OF THE INVENTION

The present invention provides a system, method and device for providing communications with an in-home system at a residence of a user. In one embodiment, the method comprises receiving digital television programming content from a television service provider, receiving a first user input of a selected digital television programming content, in response to receiving the first user input, causing the selected digital television programming content to be displayed on a television, receiving a message from an in-home system, in response to receiving the message, causing a notification to be displayed on the television as an overlay over the displayed television programming content, receiving a first user command, determining a first control message to transmit to the in-home system in response to receiving the first user command, transmitting the first control message to the in-home system, wherein the in-home system may comprise a video camera, an entry way security system, an HVAC system, a lighting system, an alarm system, or other in-home system. User inputs may be received via a remote control to a set top box or from a computing device at a remote computer system through the internet and/or a mobile telephone network.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description.

Figure 1:
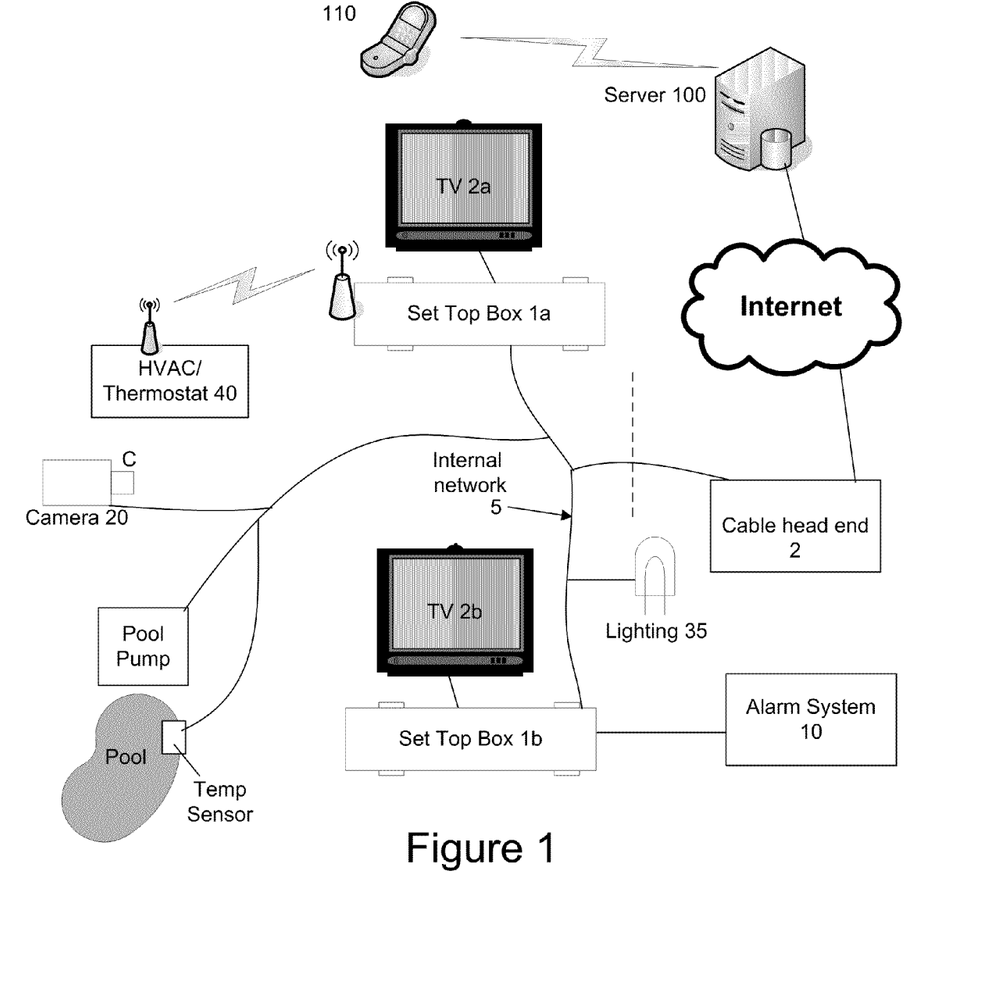
FIG. 1 is a block diagram of a system, in accordance with an example embodiment of the present invention.

FIG. 1 illustrates an example embodiment of an in-home system (connected to a cable head end) according to an example embodiment of the present invention, which is used to monitor and/or control one or more in-home systems. As shown, the system includes a first set top box 1a connected to a television 2a, a second set top box 1b connected to a second television 2b. Each set top box 1 is connected to an internal (in-home) coaxial cable network 5. In other embodiments the in-home network may comprise fiber, wireless, twisted pair, Cat-5, or any other suitable medium. The internal network 5 may be connected to a cable head end 2 and thereby allow the set top boxes 1 to also communicate via the internet to one or more remote servers 100. In this example embodiment the set top boxes 1 take the form of a separate device that is electrically connected to the television or other display device, in other embodiments the set top box may take the form of a cable card inserted in or integrated into the television. In this example embodiment, the set top box 1 is operable via user actuatable buttons and a remote control and provides digital tuning (and may also provide analog tuning) to allow the user to select television programming and view electronic program guide information. The set top box 1 may also include a digital video recorder (DVR) for recording television content and also for storing information (audio, video, and other data) from the one or more in-home systems. While the present invention uses one or more set top boxes 1, other embodiments of the system may alternately, or additionally, use televisions (e.g., a television with two way communications capabilities such as those having a cable card), a computer, a DVR, or other communications device. As discussed, in this embodiment, the set top boxes 1 are operable via a remote control that allows the user to interact with various interactive menus and/or to tune to a specific channel to receive monitoring information.

Various in-home systems may be monitored and/or controlled including, but not limited to, an in-home alarm system 10 (e.g., a burglar alarm system, a fire alarm system, etc.), cameras 20, pool system 30, hot tub, garage doors (not shown), lighting 35, heating and air conditioning (HVAC) system 40, a robot 50, an entry way security system 60, and various other systems.

The set top box 1 of the present invention include program code stored in memory that controls operation of the set top box 1 to receive and respond to user commands, to receive (and sometimes store) data from the in-home systems, to transmit control messages to the in-home systems (e.g., in response to user commands), to provide visual and/or audible notifications and alerts to the end user via the attached television or other display device, to allow communications to pass bi-directionally between the user and the in-home systems, to transmit data for storage on a remote server 100, to receive data and commands from the remote server 100 and to respond accordingly, and to perform various other functions described herein.

The user also may access the set top box(es) 1 to monitor and/or control the in-home systems via a remote device such as a computer or mobile telephone 110. More specifically, the user may access a server 100 in communication with the cable head end 2 to thereby access the set top box(es) 1 at the users residence to receive real time data include "live" or substantially live video content, audio content, temperature data, etc. Such access may require authentication such as by using a password and username. Where multiple set top boxes share are used, a single set top box 1 may act as a master and the others act as slaves to the master set top box 1. In one embodiment, information on each set top box is synchronized with the information (e.g., configuration information, in-home system information) on all of the other set top boxes 1. When a notification (and/or video and audio) is received from an in-home system by one set top box 1, the received notification (and/or video and audio) may be transmitted by the receiving set top box 1*a* to one or more other set top boxes 1*b*, which, upon receipt, cause the connected television to display the notification (and/or video and audio). Thus, the notifications (and/or video and audio) is supplied to all televisions and the user need not be concerned about whether he or she is watching the television to which an entry way security system is connected. The data communicated between set top boxes 1 may sent directly from one set top box 1*a* to the other set top boxes 1*b* over the internal network 5. Alternately, the data communicated between set top boxes 1 may sent from one set top box 1*a* to the cable head end 2, which in turn sends the data to other set top boxes 1*b*.

Figure 2:
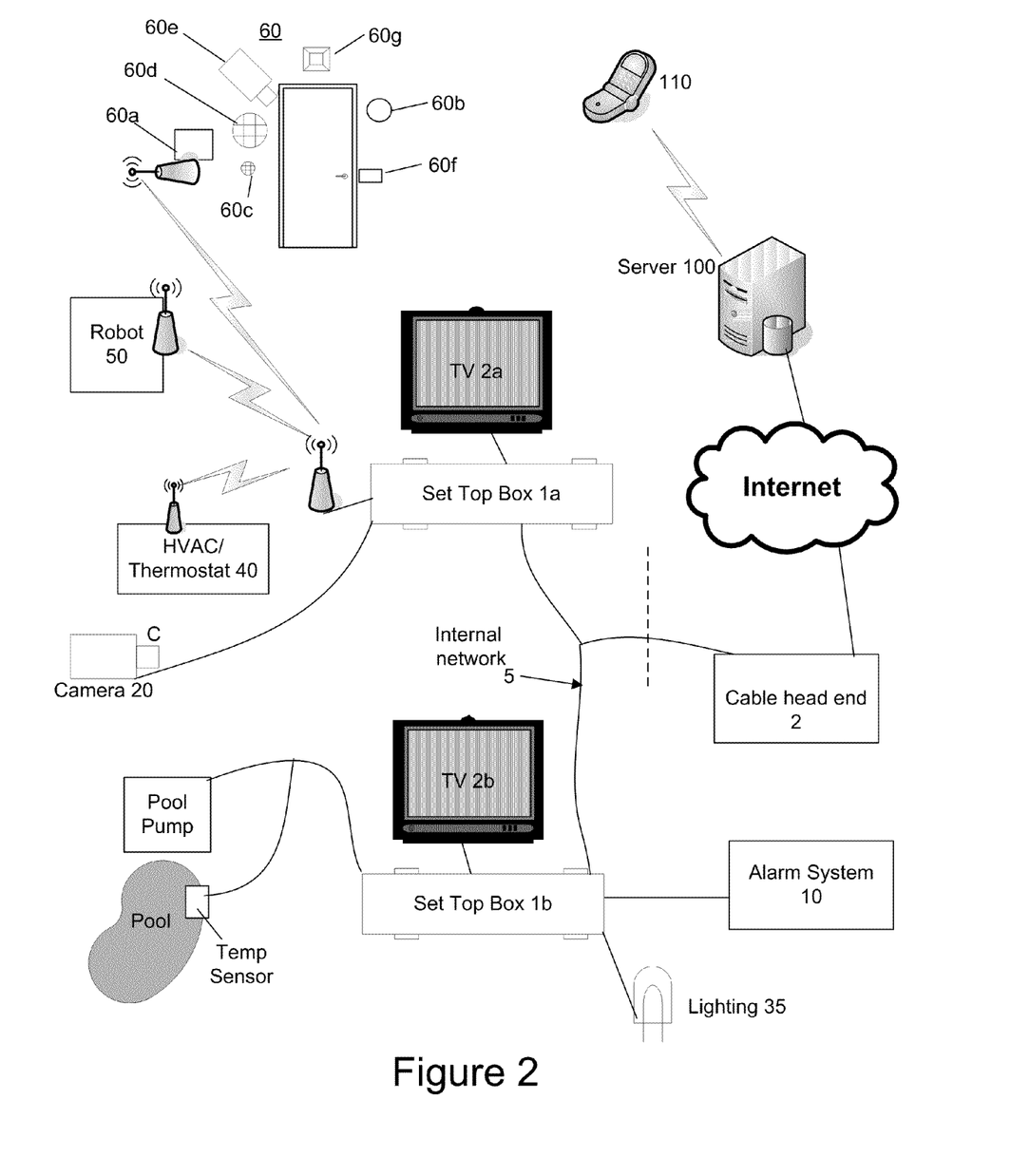
FIG. 2 is a block diagram of a system, in accordance with another example embodiment of the present invention.

The in-home systems may be connected to the set top box 1 via any suitable method. In FIG. 1, many of the in-home systems are connected to the internal network 5 while other systems, such as the alarm system 10 and HVAC system 40 are directly connected to the set top box 1. For those device connected to a set top box 1 directly (such as the alarm system 10), the in-home system be connected to a USB (Universal Serial Bus) port on the set top box, an Ethernet socket, a coaxial cable connector, or any other suitable port configured appropriately. The in-home system also may be connected to such port via a wireless connection as is illustrated for HVAC 40 in which case a wireless transceiver (e.g., IEEE 802.11a, b, g, or n) may be connected to or integrated with the set top box and/or in-home system. FIG. 2 illustrates an example embodiment in which all of the in-home systems are connected to a set top box directly (do not share the internal network). In either instance, each of the in-home instances may include a controller (e.g., processor and memory) and a transceiver In some embodiments, one or more in-home systems may communicate over the internal in-home network 5. In such an embodiment, the in-home systems may communicate using a different frequency band that those used by the cable system so as not to interfere with the cable system communications of the set top boxes 1 and cable head 2.

For example, the invention allows the end user to utilize software executed by a processor on the set top boxes 1 (or two-way televisions or other processing device) stored in memory therein to tune to a specific television channel (or channels) or actuate a button to see an overlay that displays data and/or a video window. Depending on the embodiment, a different channel may be used to access each different in-home system or a single channel may be selected to access any of the in-home systems via a menu similar to an electronic program guide. For example, the user may tune to a particular channel (or select from a particular channel) to access a first camera 20 that captures video of the area outside the front door. A second camera 20 may capture video of the pool. A third camera 20 may capture video of a basement entryway. Additional cameras that form part of an alarm system 10 may also video other areas. Thus by tuning to a specific channel (and/or by selecting the appropriate system and/or camera) the user may see who is at the front door, the pool area, and/or anyone at the basement entryway. The invention may provide access (e.g., allow users to select its in-home system channels) via a "linear channel"—a list of many television channels having interactive content (e.g., if the service provider offers a linear channel).

The system is also configurable by inputting the desired configuration into the set top box 1 (e.g., turn on or off notifications) to provide (or not provide) immediate notifications to the user. For example, in the event someone breaks into the user's residence an alert may be immediate displayed onto the television 2 by the set top box 1. The set top box 10 may also be configured to transmit a notification to local police and/or to a mobile phone or other mobile device designated by the user to receive such notifications. Furthermore, information identifying the sensor of the alarm system that triggers the alarm (and any video captured) may be recorded on the DVR and accessible by the user later. The user also may then tune (from a remote device or via the set top box) to a predetermined channel to see what alarm sensor (e.g., window, door, etc.) was breached (monitored and transmitted from the alarm system 10), so in the event no cameras are present, the user may still have an idea where the intruder might be. The actions to be taken upon receiving notification of an event (e.g., an intrusion detected, a visitor detected, fire detected, smoke detected, etc.) from an in-home system may be supplied by the user to the set top box 1 and stored in memory therein and/or at a remote server 100.

The system may allow the user to raise and lower the thermostat(s) and set schedules for heating and air conditioning from the TVs 2. As discussed, this feature (and other controls herein) can be accessed via a specific television channel or as an overlay on the existing picture (on any channel) without the need to have the data embedded into a television channel signal. In some embodiments, the television programming being displayed may be resized (smaller) so that the interface providing a message or video content can be concurrently displayed with the television programming content. Thus, the user may use the remote control associated with the television or set top box to interact with interactive television screen (an HTML file executed in a browser of the set top box, TV cable card, or computer and displayed by the television) to monitor and/or control the various devices and systems. The HVAC data (temperature settings and scheduling data) supplied by the user may be stored in memory of the set top box 1a and transmitted to the other set top boxes 1b. Depending on the HVAC system used, the data may also be transmitted to the HVAC system for storage and operation thereof. Alternately, the set top box 1a may transmit new temperature settings to the HVAC system 40 in accordance with the scheduling data stored in memory of the set top box 1. In either case, when the user subsequently accesses the HVAC system 40 configuration data, he or she can view the currently existing systems (from any set top box 1) and change them as desired.

There are a number of other devices with which the system (e.g., software executing on the cable box, TV, or other device) can communicate other than security and HVAC 40. For users having a pool or hot tub, the user may elect to view the water temperature and set a new higher or lower temperature as well as see the status of and or turn on or off the pool pump or hot tub jets. This system also may allow the residence to operate as a "smart" house to control lighting and appliances provided the infrastructure is available (e.g., the existing wiring and outlets of the residence are capable of handling that type of service—Lutron makes a system that would be an example for light and outlet control). Again, depending on the embodiment, to monitor and control the pool system the user may select a particular channel dedicated to the pool system, select a channel and then select the pool system from the available in-home systems, actuate a button on the remote to see an overlay (and select the pool system).

Provided the devices are in communication with a set top box 1 (or communicative TV or other device) the user can access all information remotely from any computer, cell phone, blackberry, or wireless device (any of which may be located at the customer premises or remote therefrom). For example, the user may connect to a server 100 (from a remote computer or from his cell phone), to access his or her set top boxes, to monitor and control the in-home systems, view alerts, view video stored on the set top box 1 (or server 100), etc. Thus, the set top boxes 1 may transmit the status of all controls messages and messages, notifications, and other sensor data to server 100 (via the cable head end and internet) and may receive control messages from the user transmitted through the server 100.

While the present invention is described in the context of a cable television system the present invention may be employed with a fiber optic television system (e.g., that employs coaxial cable or fiber to and/or in the home). In some implementations, all communications (even those from the user originating from within the home) are sent by the set top box 1 to the server 100 that processes and interprets the commands and then sends control messages to the set top box(es) 1, which then sends appropriate communications to the appropriate system. One reason for this is that various home systems may be responsive to different commands. As an example, a first home alarm system may require different control messages than a second alarm system. Consequently, when the system (or alarm system) is installed, the user may provide information about each in-home system to be monitored and controlled such as the make and mode of the in-home system and to which set top box the system is communicatively coupled (and, if applicable, to which port). The data identifying the in-home system may be sent to the server 100, which may then store the information to allow the server 100 to retrieve the correct data for operating the alarm system. For example, when the user selects an interface button to turn off the alarm system 10, the request to turn off the alarm system 10 may be sent to the server 100, which retrieves from a database the control message for turning off the user's alarm system 10 (from a plurality of other alarm systems) and transmits the control message to the set top boxes 1 for transmission to the in-home alarm system.

In addition, the software stored on any of the home systems may be upgraded via the set top box. Thus, a remote server may receive new software and transmit the new software to the appropriate set top box for transmission to the appropriate in-home system.

In another embodiment, the set top box 1 transmits the information identifying the in-home system and the server 100 retrieves and sends the command set for that in-home system to the set top box(es) 1 for storage. The command set(s) may be stored on every set top box or only on the set top box 1 that is configured to transmit commands to that in-home system. For example, in FIG. 2 only set top box 1a transmits commands to HVAC system 40 so the command set for the HVAC system 40 need only be stored on set top box 1a. Similarly, only set top box 1b sends commands to the pool pump so the command set for the pool pump need only be stored on set top box 1b. Thus, when the user enters a command to turn off the pool pump, set top box 1b will retrieve the "turn off" command from the pool pump command set stored in memory therein and transmit the retrieved command it to the pool pump (whether the user request comes directly from the remote control or from set top box 1a or from the server 100).

The present invention also may be used to control and monitor one or more in-home robots such as a robot for performing clearing and/or a security robot. In either instance, the robot 50 comprises a mobile robot and may include infrared sensors, sonar sensors, motion sensors, an alarm (e.g., audible and visual), an audio input device (e.g., a microphone), a wireless transceiver, a video camera and/or a still image photo camera. The robot may also include a speaker. The robot may be programmed with multiple paths for a customized patrol through (or around) the user's residence. The robot will move along a path, detecting and avoiding obstacles with its infrared and/or sonar sensor and repeat the sequence until issued new commands. The robot may include a rechargeable battery which draws power from a recharging base, which the robot can locate using its built-in infrared sensor when commanded to re-charge. A suitable robot having many of these components is commercially available as the Rovio Wi-Fi Enabled Robotic WebCam from WowWee Group Limited of Carlsbad, Calif.

Thus, upon detection of motion the robot may be programmed to wirelessly transmit a notification to a set top box 1 along with audio and video content (which may be taken using a night vision video camera if at night). For example, while the user is watching television a notification may be displayed on the television by the set top box 1 along with a video window displaying the video content captured by the video camera and the audio captured by the microphone of the robot. The user may then control the location of the robot 50 and move the robot 50 closer to an object in the video. The user may also elect to actuate an audible and visual alarm (in hope of scaring away an intruder). In addition, the user may speak into a microphone communicatively coupled to the set top box 1 (such as in the remote), which would then transmit the audio to the robot 50 which would audibly reproduce the speech out of its speaker. Thus, the user may also engage in a conversation with someone near the robot 50 (e.g., "This is private property. Why are you here?").

Another home system that may be suitable for monitoring and control via the present invention is an entry way security system 60 having a control system 60*a*, a transceiver (e.g., a wireless transceiver such as an IEEE 802.11a, b, g, or n transceiver), a motion sensor 60*b*, an audio input device (e.g., microphone) 60*c*, a speaker 60*d*, a video camera 60*e*, a light sensor (not shown), an entry way access control mechanism 60*f*, and a light 60*g*. Any of the transceiver, motion sensor 60*b*, audio input device 60*c*, speaker 60*d*, video camera 60*e*, light sensor, entry way access control mechanism 60*f*, and light 60*g* may be communicatively coupled to the control system 60*a*. The motion sensor 60*b* may be position to detect the motion of anyone approaching the entry way and the video camera 60*e* may be positioned to capture a video of anyone approaching the entryway. Upon detection of motion by the motion sensor, the entry way security system 60 may actuate the video camera 60*e* and microphone 60*c* and transmit a notification to the set top box 1*a* along with the captured video and audio content via the wireless transceiver. In addition, if the light sensor indicates that it is dark, the light 60*g* may be turned on to thereby provide better lighting for capturing the video. In some embodiments, the system 60 may include a doorbell that actuates the video camera 60*e* and microphone 60*c* for communications with the visitor.

For example, while the user is watching television a notification may be displayed on the television 2 (both televisions) by the set top box 1 (each set top box) along with a video window displaying the video content captured by the video camera 60*e* and the audio captured by the microphone 60*c* of the entry way security system 60. In addition, the user may speak into a microphone communicatively coupled to the set top box 1, which may then transmit the audio to the entry way security system 60 which would audibly reproduce the speech out of the speaker 60*d*. Thus, the user may also engage in a conversation with someone at the entry way (e.g., "Please leave the package at the front door"). The user may also actuate the entry way access control mechanism 60*f*(e.g., remotely unlock the door) to allow the visitor to enter through the entryway. It is worth noting that different embodiments may employ fewer or more components. As example, some entry way security systems 60 need not include the entry way access control mechanism 60*f*, the light, or other components. In addition, in some embodiments the entry way security systems 60 may be formed of subsystems. For example, a video camera may include a light, motion sensor, video camera, and microphone integrated therein.

The audio and video content captured by any of the home systems and other data (e.g., status data (e.g., on or off), temperature data, history data (e.g., temperature, time/date turned on, off, changed, etc.)) may be stored in memory of the set top box on the digital video recorder. Consequently, when a person returns home, he or she can access stored audio and video content to determine who visited the entry way of his or her residence or to see the temperature of the home throughout the day and when the HVAC thermostat setting was last changed.

In some embodiments, the set top box 1 may act mostly as a routing device (meant to include routing, bridging, switching) to allow the remote server(s) 100 and/or head end 2 to communicate with and control the in-home systems. In such a system, the set top boxes 1 may include a routing table with the addresses (or associated ports) of the in-home systems. In other embodiments, the set top boxes 1 may be "smarter" and request, receive and store the command set, map the command set to each potential user input, retrieve the appropriate command from the command set in response to a user input, and transmit the command to the in-home system. Where the set top box 1 acts mostly as a router (and for displaying information) the server 100 or other remote computer system may perform these processes.

Figure 3:
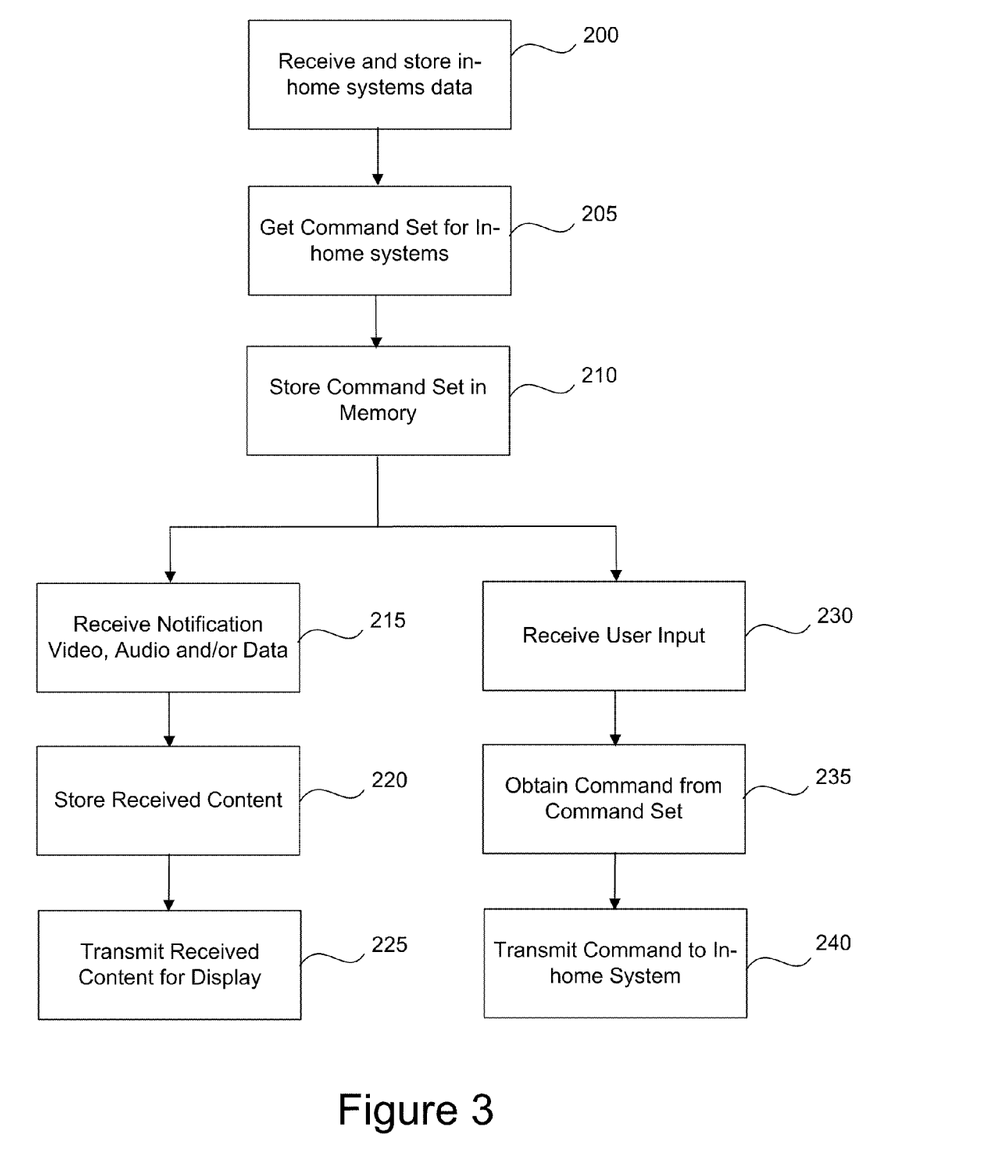
FIG. 3 depicts a flow chart for operation of a system, in accordance with an example embodiment of the present invention.

FIG. 3 illustrates operation of an example embodiment of the present invention. At 200 the information identifying the in-home system, (and the set top box to which the in-home system is connected if appropriate) is received and stored in memory. As an example, the information may be supplied by the user via the remote control or via a website interface (to server 100). At 205 the command set for the in-home system is obtained and mapped to the potential inputs that can be supplied by the user. The command set (and mapping information) is then stored in memory at 210. As discussed above, these processes may be performed by the set top box 1, the server 100, or a combination thereof.

At 215 a notification, video content, audio content, and/or other data is received from an in-home system. If so configured, the received content may be stored at 220 such as by the DVR of the set top box 1 or on the server 100. At 225, the received content is provided to a display device for display (and, if applicable, audibly produced) to the user. The content may be immediately displayed such as in response to receiving the content from an entry way security system or robot. Alternately, the content may be displayed (from memory) in response to a user request to view the received content. As discussed above, these processes 215-225 may be performed by a set top box 1, the server 100, or a combination thereof.

At 230 the process may include receiving a user input to control and/or monitor a command. The input may come from a remote control directly to a set top box or from a remote computing device (e.g., a mobile telephone) to a remote server 100. For example, the user input may include a command requesting data (to monitor the in-home system) such as HVAC (or pool or hot tub) temperature data or thermostat setting data (including scheduled settings), a request to see video from a video camera (including from an entry way security system), a request for status information (e.g., lights on or off; garage door on or off), a request to hear audio from an audio input device, a request to see status information (e.g., from an alarm system), etc. The user input also may include a command to control (or data for) an in-home system such as a command to a HVAC (or pool or hot tub) to change a thermostat setting data (including scheduled settings), a command to start or stop capturing video by a video camera(such as by an entry way security system, robot, etc), a command start or stop capturing audio content (such as by an entry way security system, robot, etc), a command to turn or off an alarm system, a command to turn on or off a pool pump, a command to control an entry way access control mechanism 60*f*, voice data (to be reproduced by a speaker), to control movement of a robot or video camera, to open or close a garage door, to turn on or off a kitchen appliance (e.g., dishwasher, coffee maker, etc.), etc.

If necessary, at 235 the command from the mapped command set is obtained. For some user inputs this may not be necessary. For example, if the user is requesting thermostat settings for an HVAC system 40, the requested information may be resident in memory on the set top box 1 (or server 100)

and no command need be sent to the HVAC system 40 to obtain the desired data. When necessary, the obtained command is then transmitted to the in-home system at 240. Depending on the command the set top box may then receive a response (e.g., video content, audio content, status information, etc.) and the process may continue at 215. As discussed above, these processes 230-240 may be performed by the set top box 1, the server 100, or a combination thereof.

Figure 4:
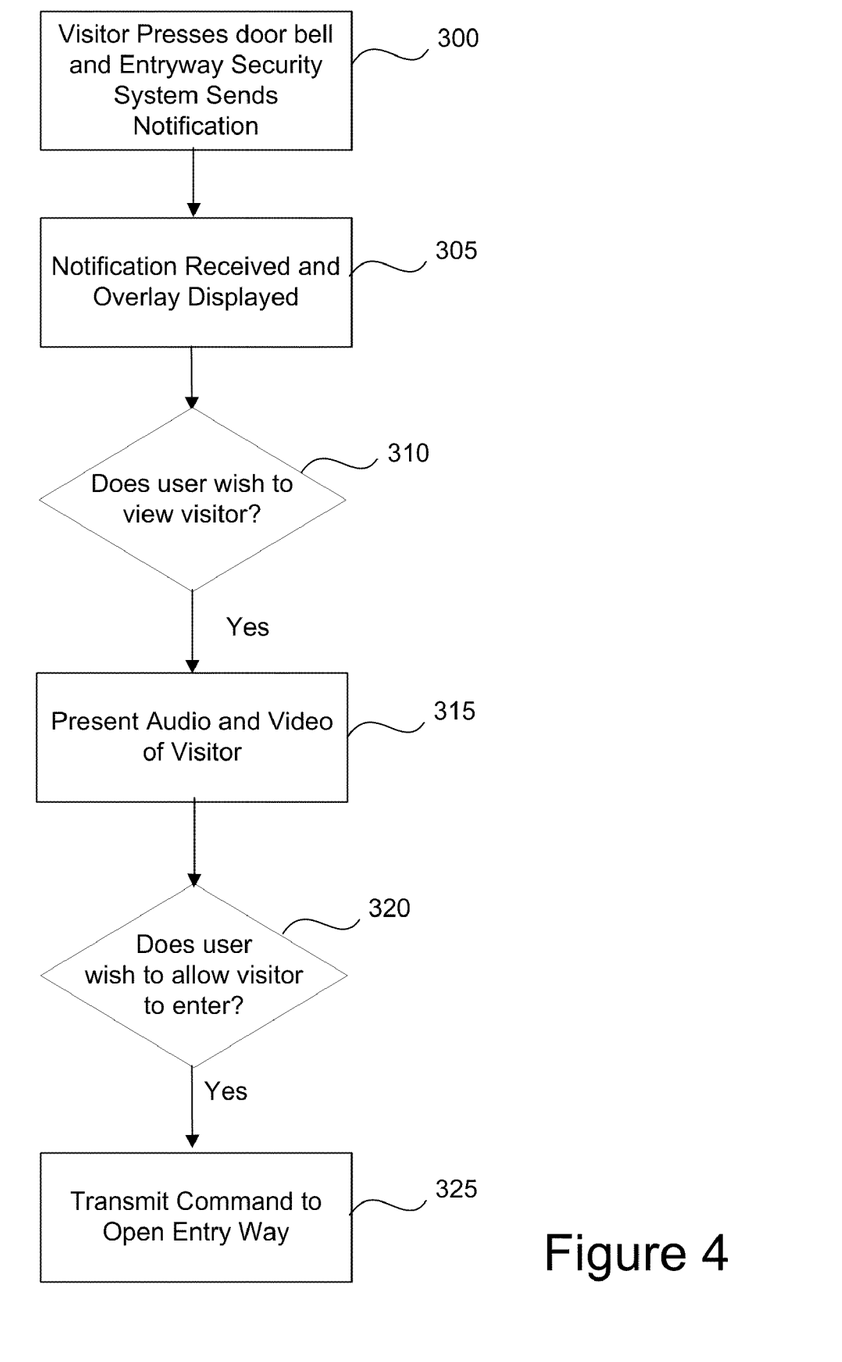
FIG. 4 depicts a flow chart for operating an entry way access system, in accordance with an example embodiment of the present invention.

FIG. 4 illustrates an example process for using an entry way security system 60. At 300 a visitor presses a door bell and the entry way security system 60 transmits a notification to the set top box 1*a*. The set top box 1*a* retrieves an overlay from memory and displays an overlay in the form of graphical or text information and displays the overlay over the existing picture at 305 on the display device. The overlay informs the user that someone has pressed the door bell and asks the user if he or she wishes to view (and hear) the visitor. A user watching the television 2*a* may then elect to view or not view the visitor. If at 310 the user responds (via use of the remote control) by indicating that he or she does wish to view the visitor, a video of the visitor at the entrance will appear either in an overlay or on specific channel at 315. The user may also engage in a conversation with the visitor as discussed above. The user may then be prompted to choose between admitting or declining entry of the visitor through the entry way at 320. Alternately, the user at any time may actuate the display interface to allow entry of the visitor. If the user decides to admit the visitor, a command to open (e.g., unlock) the entry way is transmitted to the security system 60 at 325.

In some embodiments, the interfaces displaying the notifications and allowing the user to supply commands and data (e.g., configuration data) comprise HTML templates stored in memory of each set top box 1.

In one embodiment the system, comprises one or more communication devices configured to be connected to a wired television network and to provide digital television tuning; one or more devices having a communications interface and connected to one of the communication devices; wherein the one or more communications device are configured to receive a first input from the user and send a command message to a selected device of the one or more device to control operation of the selected device; one or more cameras having a communications interface and connected to one of the communication devices; wherein the one or more communications device are configured to receive a second input from the user and display video content received from a selected camera and to cause the received video content to be displayed on a television; an alarm system having a communications interface and connected to one of the communication devices; wherein the one or more communications devices are configured to receive a third input from the user and to receive data from alarm system element and to cause the received data to be displayed on a television; a HVAC system having a communications interface and connected to one of the communication devices; and wherein the one or more communications devices are configured to receive a fourth input from the user and send a command message to the HVAC system to control operation of the HVAC system. The one or more communication devices may be further configured to receive the inputs from the user via a remote control and via the Internet.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A system for providing communications with an in-home system at a residence of a user, comprising:
    a set top box having a first communication port configured to receive digital television programming content;
    said set top box being responsive to a user input to tune to a selected digital television programming content;
    said set top box having a second port configured to be connected to a television;
    said set top box having a third port configured to transmit data to, and receive data from, an in-home system that includes a video camera;
    wherein said set top box is configured to receive video content from the video camera and is configurable by the user to cause said video content to be displayed on a television connected to said second port;
    wherein said set top box includes a memory and is configurable by the user to cause said received video content to be stored in said memory for subsequent display in response to a user input;
    wherein one or more templates are stored in the memory;
    wherein said set top box is configured to cause at least some of the templates to be displayed on a television connected to said second port; and
    wherein said at least some of said templates are configured to present information to the user for monitoring operation of the in-home system.

2. The system according to claim 1, wherein said set top box is configured to receive a first message from the in-home system and, in response, to cause a notification to be displayed on a television connected to said second port; and
    wherein the notification is displayed in an overlay over television programming content being displayed by the television.

3. The system according to claim 1, wherein the in-home system includes a microphone and a speaker;
    wherein said set top box is configured to receive audio content captured by the microphone and wherein said set top box is configurable by the user to:
    cause a television connected to the second port to audibly output audio content captured by the microphone; and
    transmit out the third port audio content from the user for audible production by the speaker of the in-home system.

4. The system according to claim 1, wherein the memory storing:
    one or more user commands available to the user for the in-home system;
    one or more messages for transmitting to the in-home system; and
    wherein at least one message is associated in the memory with each of the one or more user commands.

5. The system according to claim 1, wherein the in-home system includes an entry way access mechanism configured to control access through an entry way; and
    wherein said set top box is configured to receive a first user input and, in response to receiving the first user input, to transmit a message to the in-home system to control operation of the entry way access mechanism in accordance with the first user input.

6. The system according to claim 1, wherein said third port comprises a wireless transceiver integrated into the set top box.

7. The system according to claim 1, further comprising:
a computer system remote from the residence and including a memory storing:
one or more user commands available to the user for the in-home system;
one or more messages for transmitting to the in-home system;
wherein at least one message is associated in memory with each of the one or more user commands; and
wherein the computer system is configured to select a first message in response to receiving a first user command and to transmit the first message to the set top box for transmission to the in-home system.

8. A set top box for providing communications with an in-home system at a residence of a user, comprising:
a first port configured to receive digital television programming content;
said set top box being responsive to a user input to tune to a selected digital television programming content;
a second port configured to be connected to a television;
a third port configured to transmit data to, and receive data from, an in-home system;
a memory;
wherein said memory stores one or more user commands available to the user for controlling the in-home system;
wherein said memory stores one or more messages recognizable by the in-home system;
wherein at least one message is associated in said memory with each of the one or more user commands;
wherein said set top box is configured to receive a first user command from the user, to select at least one message associated with the first user command, and to transmit via the third port the selected at least one message to the in-home system;
wherein said set top box is configured to receive a message from the in-home system and, in response, to cause a notification to be displayed on a television connected to said second port; and
wherein the notification is displayed in an overlay over television programming content being displayed by the television.

9. The set top box according to claim 8, wherein said first user command is received via the first port from a remote computer system.

10. The set top box according to claim 8, wherein said set top box is configured to transmit via the first port a request for the one or more messages to a remote computer system.

11. The set top box according to claim 8, wherein the in-home system includes a video camera and said set top box is configured to receive video content from the in-home system; and
wherein said set top box is configurable by the user to cause said received video content to be stored in said memory for subsequent display in response to a user input.

12. The set top box according to claim 11, wherein the in-home system includes a microphone and a speaker and said set top box is configured to receive audio content captured by the microphone and wherein said set top box is configurable by the user to:
cause a television connected to the second port to audibly output audio content captured by the microphone; and
transmit out the third port audio content from the user for audible production by the speaker of the in-home system.

13. A method of using a set top box to provide communications with an in-home system at a residence of a user, comprising:
receiving digital television programming content from a television service provider;
receiving a first user input of a selected digital television programming content;
in response to receiving the first user input, causing the selected digital television programming content to be displayed on a television;
receiving a message from an in-home system;
in response to receiving the message, causing a notification to be displayed on the television as an overlay over the displayed television programming content;
receiving a first user command;
determining a first control message to transmit to the in-home system in response to receiving the first user command; and
transmitting the first control message to the in-home system, wherein the in-home system comprises one of the group of: a video camera, an entry way security system, and an air conditioning system, wherein said displaying a notification, said receiving a first user command, said determining a first control message to transmit, and said transmitting the first control message are performed by the set top box located at the residence of the user.

14. The method according to claim 13, further comprising:
storing in a memory on the set top box one or more user commands available to the user for controlling the in-home system;
storing in the memory one or more messages recognizable by the in-home system;
wherein at least one of the messages is associated in the memory with each of the one or more user commands; and
wherein said determining comprises selecting at least one message associated with the first user command; and
wherein the first user command comprises the selected command.

15. The method according to claim 13, further comprising:
receiving video content from a video camera of the in-home system; and
storing the video content in the memory of the set top box at the residence.

16. A method of using a set top box to provide communications with an in-home system at a residence of a user, comprising:
receiving digital television programming content from a television service provider;
receiving a first user input of a selected digital television programming content;
in response to receiving the first user input, causing the selected digital television programming content to be displayed on a television;
receiving a message from an in-home system;
in response to receiving the message, causing a notification to be displayed on the television as an overlay over the displayed television programming content;
receiving a first user command;
determining a first control message to transmit to the in-home system in response to receiving the first user command; and
transmitting the first control message to the in-home system, wherein the in-home system comprises one of the group of: a video camera, an entry way security system, and an air conditioning system, wherein said displaying a notification, said receiving a first user command, said determining a first control message to transmit, and said transmitting the first control message are performed by a computer system remote from the residence of the user;

the method further comprising at the residence of the user with the set top box:

receiving the first control message; and transmitting the first control message to the in-home system.

17. The method according to claim 16, wherein the first user command is received via a communication path that includes the Internet.

18. The method according to claim 16, wherein the first user command is received via a communication path that includes a mobile telephone network.

* * * * *